US012317020B2

(12) United States Patent
Hanada et al.

(10) Patent No.: US 12,317,020 B2
(45) Date of Patent: May 27, 2025

(54) HEADSET

(71) Applicant: FOSTER ELECTRIC COMPANY, LIMITED, Tokyo (JP)

(72) Inventors: Takeshi Hanada, Tokyo (JP); Ligang Liu, Tokyo (JP); Yusuke Kondou, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 187 days.

(21) Appl. No.: 17/927,731

(22) PCT Filed: May 26, 2021

(86) PCT No.: PCT/JP2021/020033
§ 371 (c)(1),
(2) Date: Nov. 24, 2022

(87) PCT Pub. No.: WO2021/241641
PCT Pub. Date: Dec. 2, 2021

(65) Prior Publication Data
US 2023/0224619 A1 Jul. 13, 2023

(30) Foreign Application Priority Data
May 26, 2020 (JP) ................................ 2020-091313

(51) Int. Cl.
*H04R 1/10* (2006.01)
*H04R 1/28* (2006.01)

(52) U.S. Cl.
CPC ......... *H04R 1/1016* (2013.01); *H04R 1/2853* (2013.01); *H04R 1/1083* (2013.01); *H04R 2410/00* (2013.01)

(58) Field of Classification Search
CPC .. H04R 1/1016; H04R 1/2853; H04R 1/1083; H04R 2410/00; H04R 1/1075;
(Continued)

(56) References Cited

U.S. PATENT DOCUMENTS 10,021,478 B2 7/2018 Wurtz et al.
2008/0262382 A1 10/2008 Akkermans et al.
(Continued)

FOREIGN PATENT DOCUMENTS

CN 101437449 5/2009
CN 208707886 U * 4/2019 ............... H04R 1/10
(Continued)

OTHER PUBLICATIONS

"International Search Report (Form PCT/ISA/210) of PCT/JP2021/020033", mailed on Aug. 17, 2021, with English translation thereof, pp. 1-4.

*Primary Examiner* — Angelica M McKinney
(74) *Attorney, Agent, or Firm* — JCIPRNET

(57) ABSTRACT

A headset of the present disclosure includes a housing 1 worn on user's ears, an ear-canal insertion portion 10 with a cylindrical shape provided at an ear-canal side of the housing 1 as a part of the housing 1, a driver 4 for outputting a signal provided inside the housing 1, and a microphone 5 provided at the back of a signal outputting surface of the housing 1 to acquire a response signal from a front of the driver 4.

15 Claims, 16 Drawing Sheets

(58) Field of Classification Search
CPC ...... H04R 1/02; H04R 1/1058; H04R 1/2896; H04R 1/10; H04R 5/033; G10K 11/22; G10K 11/178
See application file for complete search history.

(56) References Cited

U.S. PATENT DOCUMENTS

| | | | | |
|---|---|---|---|---|
| 2009/0316944 | A1* | 12/2009 | Tiscareno | H04R 1/2896 381/346 |
| 2010/0316225 | A1 | 12/2010 | Saito et al. | |
| 2010/0329481 | A1 | 12/2010 | Fukuda et al. | |
| 2012/0195440 | A1 | 8/2012 | Yamagishi | |
| 2013/0336512 | A1* | 12/2013 | Kim | H04R 1/1016 381/380 |
| 2014/0233746 | A1* | 8/2014 | Tanaka | H04R 1/1058 381/66 |
| 2014/0233749 | A1* | 8/2014 | Shimizu | H04R 1/1016 381/71.6 |
| 2015/0023542 | A1* | 1/2015 | Shimizu | H04R 1/1075 381/380 |
| 2015/0341718 | A1* | 11/2015 | Shin | H04R 1/02 381/66 |
| 2018/0096674 | A1* | 4/2018 | Lin | G10K 11/178 |
| 2019/0230448 | A1 | 7/2019 | Sjursen | |
| 2021/0195310 | A1* | 6/2021 | Kim | H04R 1/1016 |
| 2021/0250672 | A1* | 8/2021 | Han | H04R 1/1075 |

FOREIGN PATENT DOCUMENTS

| | | | | |
|---|---|---|---|---|
| EP | 1938093 | | 7/2008 | |
| JP | 2009509575 | | 3/2009 | |
| JP | 2011015080 | | 1/2011 | |
| JP | 4734441 | | 7/2011 | |
| KR | 20080072323 | A * | 8/2008 | H04R 1/10 |
| TW | M553910 | U * | 1/2018 | H04R 5/033 |
| TW | 201815170 | | 4/2018 | |
| WO | 2012046368 | | 4/2012 | |
| WO | 2012120295 | | 9/2012 | |
| WO | 2016181431 | | 11/2016 | |
| WO | 2019147494 | | 8/2019 | |
| WO | 2020045705 | | 3/2020 | |

* cited by examiner

HEADSET

CROSS-REFERENCE TO RELATED APPLICATION

This application is a 371 application of the International PCT application serial no. PCT/JP2021/020033, filed on May 26, 2021, which claims the priority benefits of Japan Patent Application No. 2020-091313, filed on May 26, 2020. The entirety of each of the above-mentioned patent applications is hereby incorporated by reference herein and made a part of this specification.

FIELD OF INVENTION

The present disclosure relates to headsets.

BACKGROUND

Conventionally, earphones and headphones have been developed as electrical sound converters for converting electrical signals to sound signals. Earphones are mainly worn and used in pinna or ear canal, and headphones are a combination of earphones and a band worn on a head. In addition, equipment in which microphones for collecting sound from a user are assembled in earphones and headphones is called a headset. Accordingly, a headset includes earphones and headphones. One known headset includes therein a driver which is a source of sound signals and includes an ear canal inserting portion at an eardrum-side of the driver.

However, when this conventional-type headset is worn, it blocks an entrance of the ear canal by a certain amount such that sound characteristics in the ear canal change. That is, when nothing is worn on the ears, only the eardrum-side of the ear canal is blocked, and sound is transmitted by resonance in an open-end pipe. Meanwhile, when the headset of this type is worn on a head, the resonance changes to resonance in a closed-end pipe, because not only the eardrum-side but an entrance-side of the ear canal is also blocked. Therefore, there is a problem that the sound characteristics at an eardrum changes by wearing the headset.

There is a technology to cope with the change of the sound characteristics in the ear canal produced when wearing the headset by controlling an output characteristic from a driver in the headset and correcting the sound characteristics in the ear canal. In such a case, to correct the sound characteristics more accurately by the driver, generally, a microphone that is referred to as a feedback microphone needs to be assembled to the headset, and feedback control is performed based on sound information of the sound in the ear canal by the feedback microphone that is worn on the ears.

In recent years, as indicated in Patent Documents 1 and 2, to reduce noise from external environment, noise cancelling technology of producing sound having a phase that is opposite a phase of the noise and cancelling the noise around the eardrum is suggested. Also in the noise cancelling, output control of the driver is performed based on the sound information collected from the aforementioned feedback microphone.

Recently, as indicated in Patent Document 3, a scheme to verify identity of an individual by characterizing sound characteristics of the ear canal as biometrics is disclosed. This type of technology also uses the driver and the microphone to collect the sound signal thereof.

PRIOR ART DOCUMENT

Patent Document

Patent Document 1: U.S. Patent Publication 10021478
Patent Document 2: Japanese Patent Publication 4734441
Patent Document 3: Japanese Laid-Open Application 2009-509575

SUMMARY OF INVENTION

Problems to be Solved by Invention

According to the technology disclosed in Patent Document 1, since the microphone is arranged between the driver and the eardrum, the sound output from the driver is interfered by the microphone, such that the desired sound characteristics cannot be acquired.

Patent Document 2 discloses technology to collect the sound in the ear canal by arranging the microphone outside the ear canal and arranging a sound conduit from an eardrum-side end of the ear canal to the microphone. According to the technology of Patent Document 2, the sound output from the speaker would not be interfered by the microphone, and only the desired signal can be acquired. However, the sound conduit used in Patent Document 2 needs to be designed fairly precisely so as not to affect the sound characteristic, complicating assembling of the sound conduit, worsening productivity, and raising cost. Also, when the microphone is arranged outside the ear canal, downsizing of the headset would be difficult.

The present disclosure is made to address aforementioned problems of the conventional technology, and the objective is to provide a headset that can precisely acquire a response signal based on an output signal from a driver by a microphone without the microphone interfering the output signal from the driver.

Means to Solve the Problem

A headset of the present disclosure includes the following structure.

(1) A housing worn on user's ears.

(2) An ear-canal insertion portion with a cylindrical shape provided at an ear-canal side of the housing as a part of the housing.

(3) A driver for outputting a signal provided inside the housing.

(4) a microphone provided at the back of a signal outputting surface of the housing to acquire a response signal from a front of the driver.

The present disclosure may employ the following configuration.

(1) The driver may be arranged in the ear-canal insertion portion (2) The microphone may be provided at the back of the driver inside the housing.

(3) The microphone is arranged in the ear-canal insertion portion.

(4) The driver and the microphone are provided at the back of the ear-canal insertion portion inside the housing.

(5) A sound path from the front of the driver to the microphone while avoiding the driver is provided in the housing.

(6) The sound path is formed by a sound path groove formed on an inner surface of the housing, and by an outer surface of the housing.

(7) The sound path is formed by a sound path groove formed on an outer surface of the driver, and by an inner surface of the housing.

(8) The sound path is formed by a sound path groove formed on an inner surface of the housing, and by a sound path groove formed on an outer surface of the driver.

(9) The sound path groove is formed spirally on the inner surface of the housing and/or the outer surface of the driver.

(10) A plurality of the sound path grooves are formed on the inner surface of the housing and/or the outer surface of the driver.

(11) The sound path groove includes an introduction portion that extends from a central axis of the driver toward a circumferential direction of the driver in a front portion of the ear-canal insertion portion at an ear-canal side.

(12) An inner wall surface of a curved portion of the sound path is formed by a curved surface.

(13) A plurality of the sound paths are provided for the microphone.

(14) A plurality of the microphones is provided, and the sound path that reaches to each microphone is provided.

(15) A sound path that becomes a resonance space is provided inside the housing

Effect of Invention

According to the present disclosure, a headset that can precisely acquire a response signal based on an output signal from a driver by a microphone without the microphone interfering the output signal from the driver.

EMBODIMENTS

In below, embodiments of the present disclosure are described according to figures. In the specification, including claims, an eardrum-side of the ear canal is referred to as the front, and an entrance-side or an auricle-side is referred to as the backside.

1. First Embodiment

[1-1. Configuration]

Figure 1:
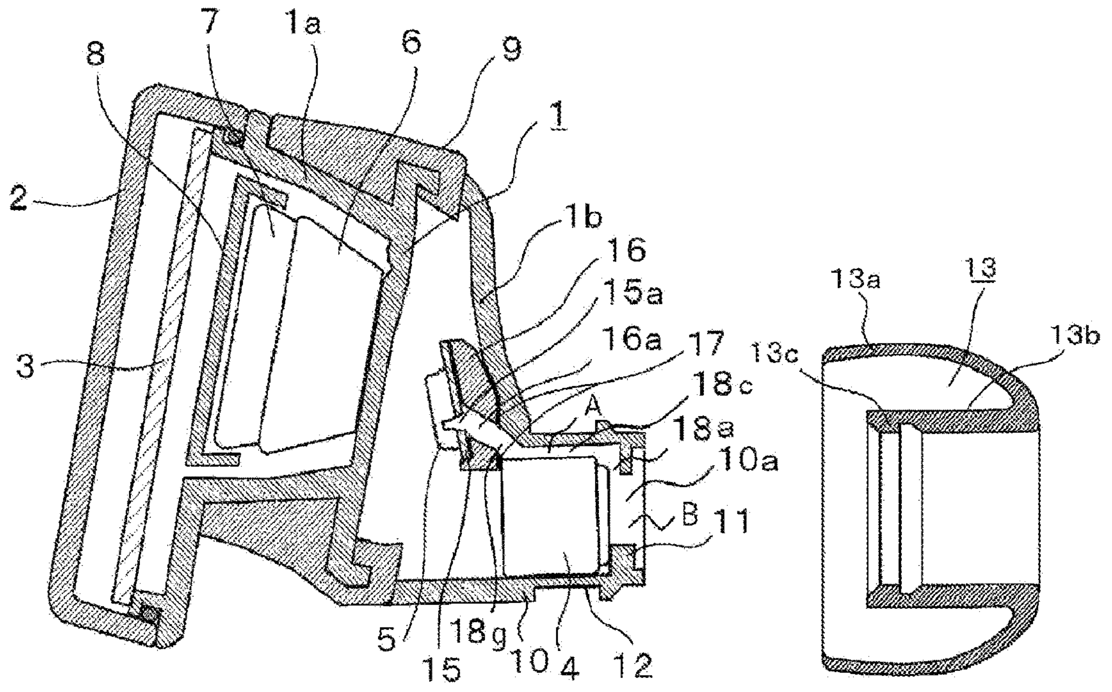
FIG. 1 is a cross-sectional view illustrating an entire configuration of the first embodiment.

As illustrated in FIG. 1, a headset of the present embodiment includes a housing 1 in which various functional parts are housed. The housing 1 is formed by engaging a main housing 1*a* and a front housing 1*b*.

The main housing 1*a* a cylindrical hollow component as a whole, and a backside opening thereof is blocked by a cover 2. A printed wiring substrate 3 is arranged inside the main housing 1*a* to face the backside opening. The printed wiring substrate 3 is a substrate on which electronic components necessary for controlling the headset are implemented. For example, output control of output signals from a driver 4 described later, adjustment of sensitivity and input frequency band of a microphone 5, control of cancel frequency band and level in noise cancelling, and various control to identify individuals by the headset using biometrics are performed according to purposes and situations for using the headset.

A battery 6 is arranged in front of the printed wiring substrate 3 via a battery cushion 7 and a battery cap 8.

As illustrated in FIG. 1, a housing rubber 9 is provided around an outer circumference of the main housing 1*a*. The housing rubber 9 is a cylindrical elastic component fit in the outer circumference of the main housing 1*a*, and prevents water from entering the main housing 1*a* while mitigating contact against the ears.

Figure 2:
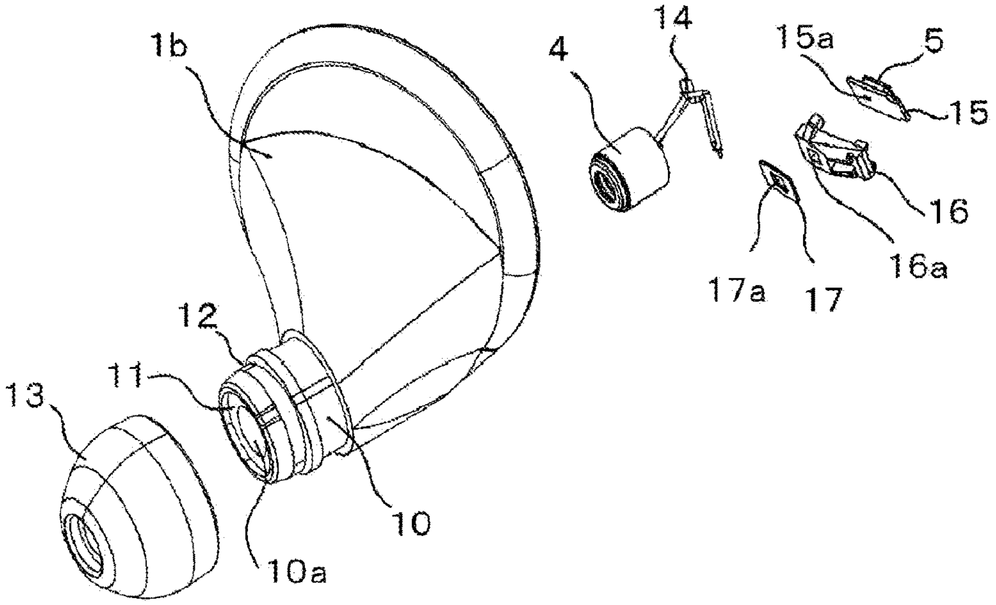
FIG. 2 is an exploded perspective view of a driver, a microphone, and a front housing portion of the first embodiment.

As illustrated in FIGS. 1 and 2, the front housing 1*b* is arranged to block a front opening of the main housing 1*a* with a cylindrical shape. The front housing 1*b* has an oblique truncated cone shape as a whole, and a part of a circumferential edge thereof is slightly risen toward the eardrum-side.

A ear-canal insertion portion 10 protruding toward the eardrum-side from an apex of the oblique truncated cone is provided in front of the front housing 1*b*. The ear-canal insertion portion 10 is a cylinder provided in a part of the front housing 1*b* opened to both front and back, and communicates the inside and outside of the front housing 1*b*. The driver 4 with a cylindrical casing is installed inside the ear-canal insertion portion 10. Therefore, a positioning portion 11 of the driver 4 with a flange shape is provided near the front opening of the ear-canal insertion portion 10, and a front end of the driver 4 abuts the positioning portion 11 and fixes the driver 4 in the ear-canal insertion portion 10. An opening 10*a* that passes and transmits the output signal from the driver 4 to the user is provide in the positioning portion 11. A backside end of the driver 4 is arranged to be near the backside end of the ear-canal insertion portion 10. For example, the driver 4 outputs not only the sound signal but also outputs biometric signals of inaudible frequencies. The driver 4 includes a magnetic circuit and a diaphragm to produce the output signal inside the cylindrical casing.

As illustrated in FIG. 2, a lead wire 14 is wired from the back of the driver 4. The lead wire 14 is connected to the printed wiring substrate 3.

The headset of the present embodiment has the microphone 5 to acquire response signals that reach the front of the driver 4. The microphone 5 is provided near the ear-canal insertion portion 10 inside the front housing 1*b*, that is, at the back of the driver 4. The microphone 5 is suitable for functions of the headset, such as noise cancelling, biometrics, and plethysmography. For example, the microphone is used as a microphone to collect sound inside the ear canal like noise cancelling feedback microphones or a vibration sensor to measure vibration inside the ear canal in the audible and inaudible frequency band, and pressure change. Note that micro electro mechanical system microphones (MEMS microphones) and electric condenser microphones (ECM), etc., may be used as the microphone 5.

As illustrated in FIGS. 1 and 2, the microphone 5 is implemented on a microphone substrate 15. The microphone substrate 15 is fixed to a microphone block 16. The microphone block 16 is a block-shaped component to support the microphone 5 and the microphone substrate 15. Openings 15*a* and 16*a* to allow vibration in the ear canal to reach the microphone 5 are provided to the microphone substrate 15 and the microphone block 16.

A pressure-sensitive adhesive 17 is provided between the microphone 5 and the microphone block 16 and between the microphone block 16 and the front housing 1*b*, to fix the two. An opening 17*a* is provided to the pressure-sensitive adhesive 17 so as not to block a sound path A and the opening 15*a* of the microphone substrate 15.

Figure 3:
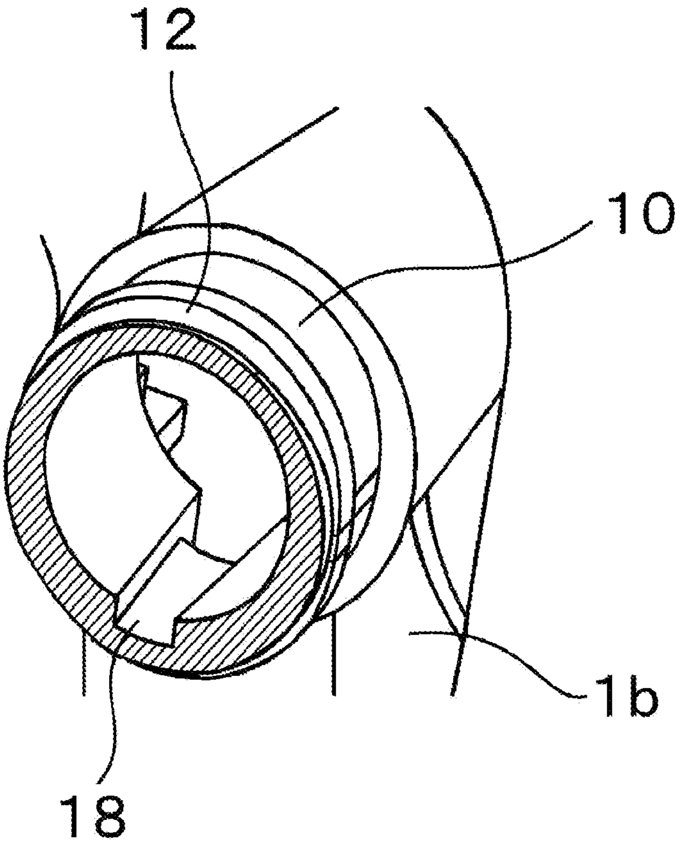
FIG. 3 is an enlarged perspective view of an ear-canal insertion portion of the first embodiment.

As illustrated in FIGS. 1 and 3, the sound path A is provided inside the ear-canal insertion portion 10 along an axial direction of the ear-canal insertion portion 10. Note that FIG. 3 is a cross-sectional view of the ear-canal insertion portion 10 along an earpiece attachment groove 12. A sound path groove 18 is formed on an inner surface of the ear-canal insertion portion as a square groove, and the sound path A is formed between an outer surface of the driver 4 and the sound path groove 18. The sound path groove 18 opens to the opening 10*a* in a front portion of the ear-canal insertion portion 10 and includes an introduction portion 18*a* extending toward the circumferential direction from the central axis of the driver 4. In addition, a middle portion 18*c* of the sound path groove 18 is a square groove and is formed on the inner surface of the ear-canal insertion portion to face the outer surface of the driver 4 along the axial direction of the driver 4 from an outer circumferential edge of the introduction portion 18*a*. A communication portion 18*g* is formed on a backside edge of the sound path groove 18 along an inner surface of the front housing 1*b*, and the backside edge of the sound path groove 18 is communicated with the opening 16*a* of the microphone block 16. The sound path A starts from the opening 10*a* of a front edge of the ear-canal insertion portion 10, passes through the introduction portion 18*a*, the middle portion 18*c*, and the communication portion, and is communicated to the opening 16*a* of the microphone block 16 fixed to the front housing 1*b*.

As illustrated in FIGS. 1 and 2, an earpiece 13 is fixed to the outer circumference of the ear-canal insertion portion 10. The earpiece 13 is also called an ear tip, an ear pad, or an ear cap, and is formed of elastic material such as silicon rubber. The earpiece 13 includes a cylinder portion 13*b* fit to the outer circumference of the ear-canal insertion portion 10, and a contact portion 13*a* having a hemispherical shape that is in close contact with the ear-canal wall surface. As illustrated in FIGS. 2 and 3, an earpiece attachment groove 12 is provided to the outer circumference of the ear-canal insertion portion 10. Meanwhile, as illustrated in FIG. 1, a fit portion 13*c* is provided in the inner circumference of the cylinder portion 13*b* of the earpiece 13. The fit portion 13*c* engages with the earpiece attachment groove 12, so that the earpiece 13 is fixed to the ear-canal insertion portion 10.

[1-2. Action of Embodiment]

The headset of the present embodiment is used by mounting the earpiece in the entrance of the user's ear canal.

The headset of the present embodiment in a case the headset has a feedback noise cancelling function will be explained. Noise produced when using the headset entering into the ear canal from outside goes through the sound path A formed by the sound path groove 18 inside the microphone 5 and reaches the microphone 5. The noise that has reached the microphone 5 is converted to an electric signal by the microphone 5. The electric signal corresponding to the converted noise is input to the controller of the printed wiring substrate 3, and an antiphase noise cancelling signal is produced. By converting the noise cancelling signal to a sound signal and outputting the sound signal from the driver 4, the noise cancelling will be performed.

In a case the headset of the present embodiment has biometric function, for example, by using individual differences of shapes of the ear canal, the driver 4 outputs a signal including the inaudible frequency, and the microphone 5 acquires the response signal including the inaudible frequency produced in the ear canal. Then, the controller analyzes the frequency of the response signal acquired by the microphone 5 to grasp the characteristic thereof and recognize the individual. Accordingly, information of high accuracy can be obtained by acquiring the response signal including the inaudible frequency.

[1-3. Effect of Embodiment]

(1) By providing the microphone 5 at the back of the output surface of driver 4, the microphone 5 would not interfere the output signal from the driver 4, addressing the problem that the desired response characteristic was not obtainable.

(2) Since the driver 4 is arranged inside the ear-canal insertion portion 10, a volume of the driver 4 at the front side can be reduced. Although high frequency characteristics vary depending on the user because the volume of the ear canal differs for every person, in the present embodiment, since the volume of the driver 4 at the front side is reduced, attenuation of the high frequency characteristic inside the ear canal can be reduced. In particular, there is a problem that the attenuation of the high frequency characteristic inside the ear canal is significantly large if the volume of the ear canal is large, according to the present embodiment, due to the reduction of the volume of the driver at the front side, the high frequency characteristic is improved and high-quality sound can be presented.

(3) By providing the microphone 5 at the back of the driver 4, the driver 4 can be arranged inside the ear-canal insertion portion 10. By effectively using a space inside the ear-canal insertion portion 10, the installation space of the driver 4 inside the housing 1 can be reduced, and the headset can be downsized.

By providing the sound path A that reaches the microphone 5 from the front of the driver 4 while avoiding the driver 4 in the ear-canal insertion portion 10, the vibration of the audible and inaudible frequency band in the ear canal can be transmitted to the microphone 5 while avoiding the driver 4. As a result, the response signal of reflected sound, etc., from the eardrum-side produced in front of the driver 4 can be surely transmitted through the sound path A to the microphone 5 even though the microphone 5 is behind the driver 4. By this, various function utilizing the microphone 5, such as noise cancelling, biometrics, and plethysmography can be effectively performed.

(5) Since the sound path groove 18 is formed on the inner surface of the ear-canal insertion portion 10, and the sound path groove 18 and the outer circumference surface of the outer surface and the front surface of the driver 4 are combined to form the sound path A, it is not necessary to separately form fine sound path pipes complicated for manufacture and assembly. Furthermore, by forming the sound path A using the outer surface of the driver 4, the ear-canal insertion portion can be downsized in the radial direction in comparison with a case in which the sound path pipe is separately formed. In this way, the sound path A to transmit the response signal to the microphone 5 can be easily formed even in the limited space in the ear-canal insertion portion 10, and small headsets with high production efficiency while reducing manufacture and assembly cost can be provided.

(6) As illustrated in FIG. 1, since a sound path B (the opening 10*a*) of the driver 4 and the sound path A of the microphone 5 are communicated, these sound path can be used as resonant space for the driver 4 to improve middle-high range frequency characteristics. Furthermore, by ensuring a certain amount of volume for the sound path A, the microphone 5 can acquire the vibration of the audible and inaudible frequency band inside the ear canal, while suppressing keen pressure change inside the ear-canal insertion portion 10 when the headset is worn.

(7) Since the microphone 5 is arranged inside the housing 1, waterproof, drip proof, and dustproof structure when the headset is worn can be easily achieved.

(8) Since the headset is configured such that the opening of the sound path A of the microphone 5 cannot be directly seen from the ear-canal side, the small opening of the sound path A would unlikely be blocked by contamination.

2. Second Embodiment

Figure 4:
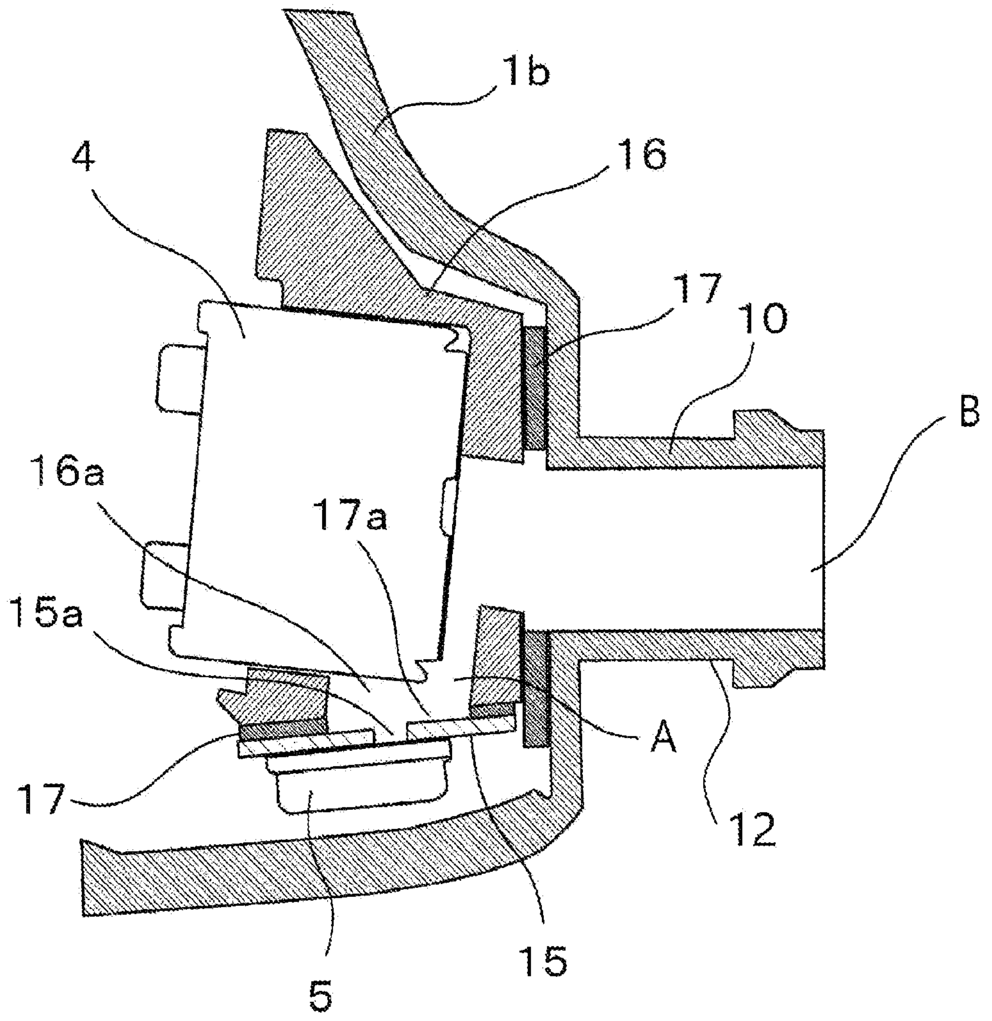
FIG. 4 is a cross-sectional view illustrating an entire configuration of the second embodiment.

As illustrated in FIG. 4, in a second embodiment, the driver 4 and the microphone 5 are provided at the back than the ear-canal insertion portion 10 of the front housing 1*b*. The microphone block 16 is configured to surround the front and the side of the driver 4, and the microphone 5 is arranged at the side of the driver 4 via the microphone block 16. The sound path A that reaches the microphone 5 from the ear-canal insertion portion 10 is provided in the microphone block 16. Other configuration is the same as the first embodiment.

(1) In the second embodiment having such a configuration, the microphone 5 is provided at the side at a signal outputting side of the driver 4. Therefore, the microphone 5 would not interfere the signal output from the driver 4.

(2) By providing the sound path A that reaches the microphone 5 from the front of the driver 4 while avoiding the driver 4 via the side of the driver 4 in the microphone block 16, the vibration of the audible and inaudible frequency band inside the ear canal can be smoothly transmitted to the microphone 5.

(3) Since the outer surface of the driver 4 and the sound path groove 18 formed in the microphone block 16 are combined to form the sound path A, the microphone block 16 can be downsized in comparison with a case in which the sound path pipe is separately provided, and the headset in which the microphone block 16 is installed can further be downsized.

(4) In addition to the above effect, the second embodiment has the same effect as the first embodiment (especially, (6) to (8)).

3. Third Embodiment

Figure 5:
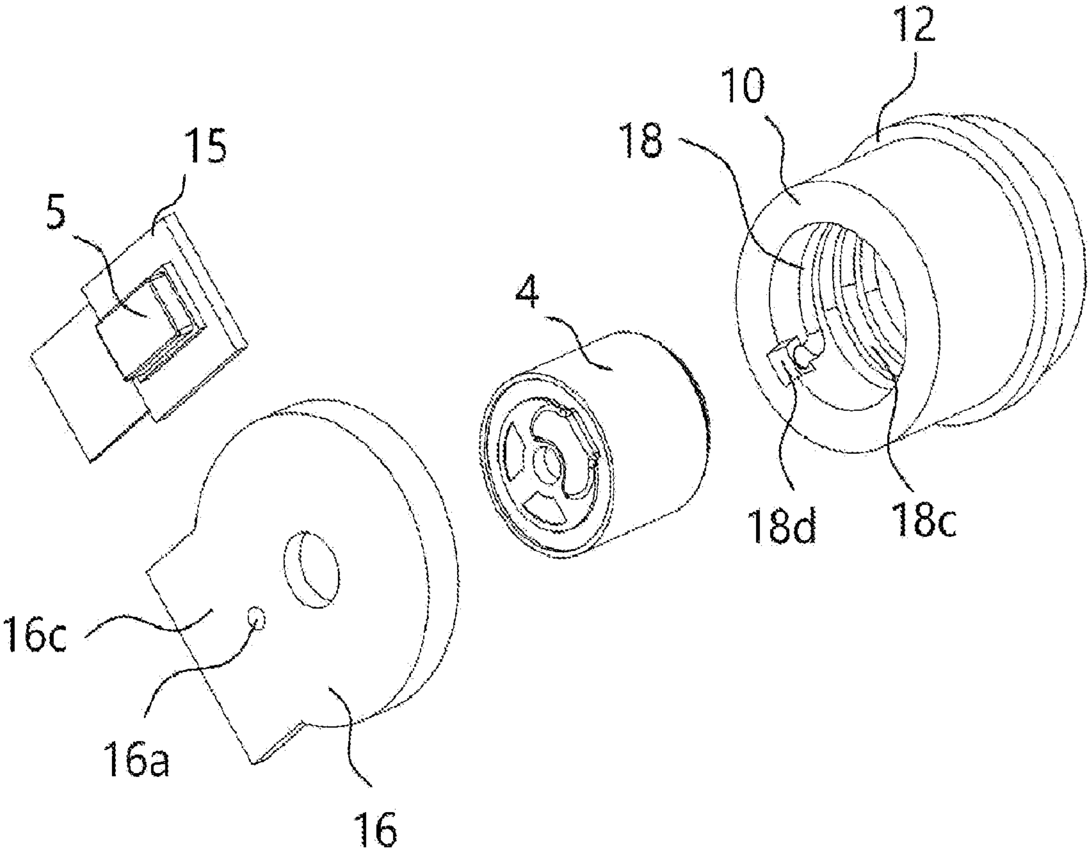
FIG. 5 is an exploded perspective view of a driver, a microphone, a microphone block, and an ear-canal insertion portion of the third embodiment.

As illustrated in FIGS. 5 to 8, in the third embodiment, the sound path A is provided spirally inside the ear-canal insertion portion 10. As illustrated in FIG. 5, an earpiece attachment groove 12 is provided in front of the outer circumference surface of the ear-canal insertion portion 10. The driver 4 is installed inside the ear-canal insertion portion 10.

Figure 6:
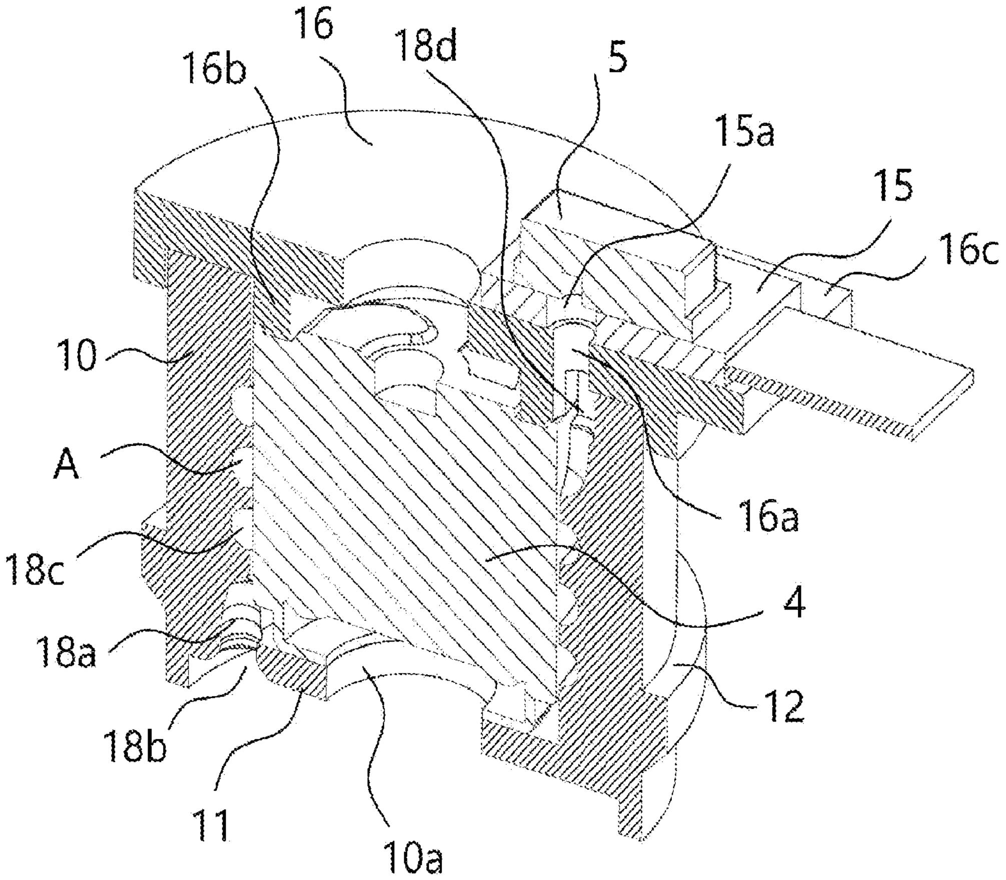
FIG. 6 is a vertical cross-sectional view of a driver, a microphone, a microphone block, and an ear-canal insertion portion of the third embodiment.
Figure 7:
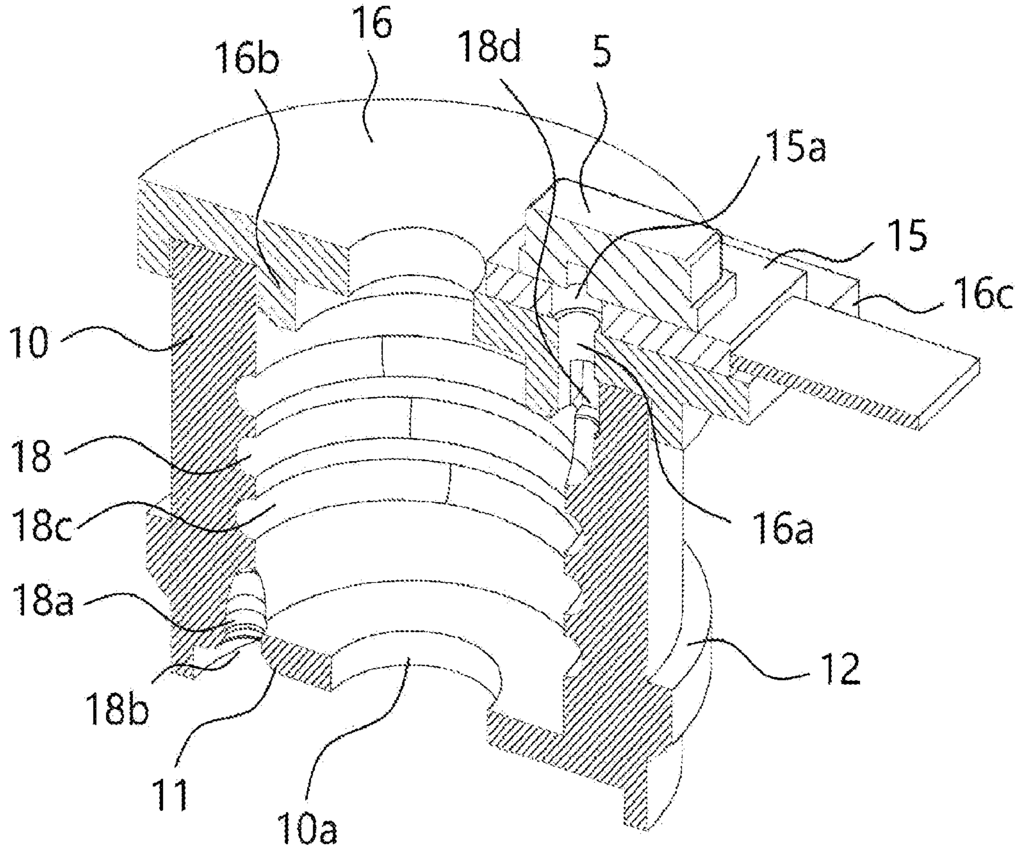
FIG. 7 is a vertical cross-sectional view of a microphone, a microphone block, and an ear-canal insertion portion of the third embodiment.

The microphone block 16 is fixed at the back of the ear-canal insertion portion 10 by mating or adhesion. The microphone block 16 has substantially disc-shape in which a through hole is at the center, and has a protruding portion 16*c* with rectangular shape to support the microphone 5 and the microphone substrate 15. As illustrated in FIGS. 5 and 6, the openings 15*a* and 16*a* are provided on the microphone substrate 15 and the microphone block 16 so that the vibration of the audible and inaudible frequency band inside the ear canal can reach the microphone 5. As illustrated in FIGS. 6 and 7, an inner circumferential wall 16*b* in the microphone block 16 along the inner surface of the ear-canal insertion portion 10. The driver 4 is sandwiched between the inner circumferential wall 16*b* of the microphone block 16 and the positioning portion 11 of the ear-canal insertion portion 10.

Figure 8:
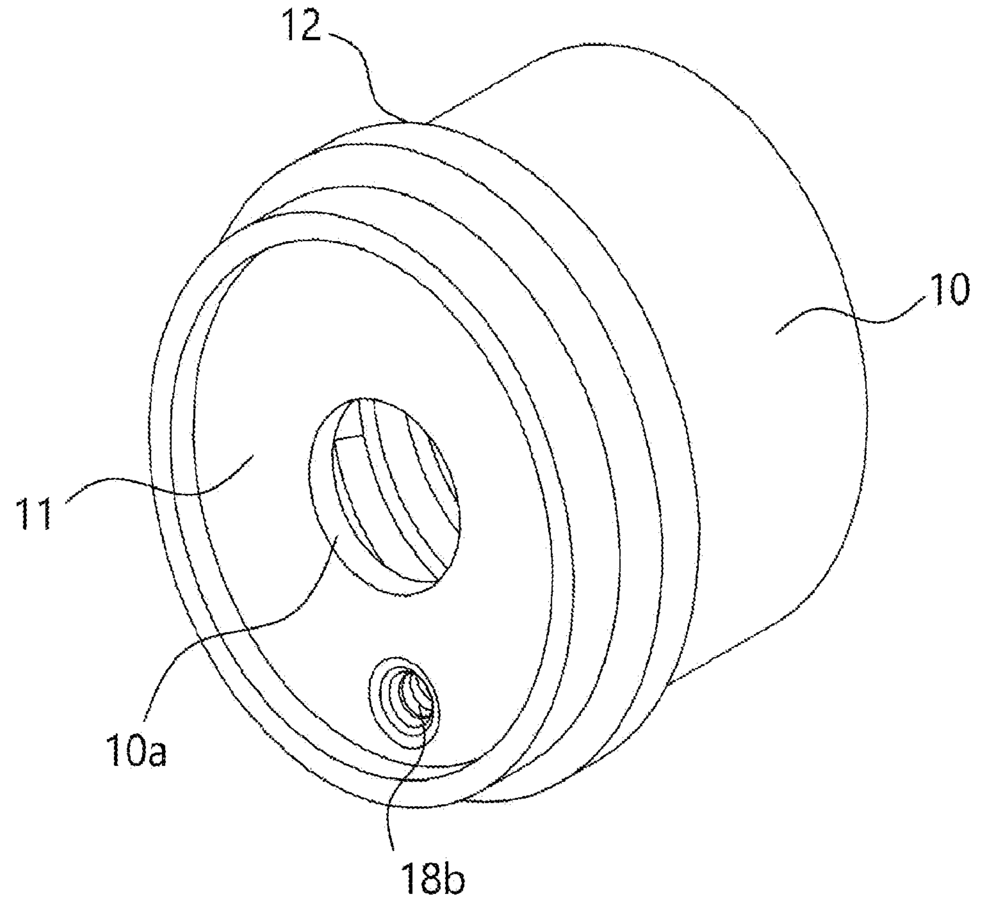
FIG. 8 is a front perspective view of an ear-canal insertion portion of the third embodiment.

As illustrated in FIG. 6, the positioning portion 11 is provided in front of the ear-canal insertion portion 10. The opening 10*a* through which the output signal from the driver 4 passes is provided to transmit the output signal to the user. Furthermore, as illustrated in FIGS. 6 to 8, the through hole 18*b* to guide the vibration of the audible and inaudible frequency band inside the ear canal to the microphone 5 is provided to the positioning portion 11.

As illustrated in FIG. 7, the sound path groove 18 is formed in semi-circle shape in cross-section on the inner surface of the ear-canal insertion portion 10 with a cylindrical shape, and as illustrated in FIG. 6, the sound path A is formed by blocking the opening of the sound path groove 18 by the outer surface of the driver 4. Note that the shape of the sound path groove is not limited to semi-circular, and may be semi-elliptical or rectangular. The middle portion 18*c* of the sound path groove 18 is formed on the inner surface of the ear-canal insertion portion 10 so as to face the outer surface of the driver 4, and is formed from the through hole 18*b* to the opening 16*a* of the microphone block 16 spirally along the axial direction of the ear-canal insertion portion 10. As illustrated in FIG. 5, a rectangular step 18*d* is formed on a rear portion of the sound path groove 18, and said portion is communicated to the opening 16*a* of the microphone block 16.

The vibration of the audible and inaudible frequency band inside the ear canal passes through the through hole 18*b*, passes through the sound path A formed spirally from the middle portion 18*c* to the step 18*d*, passes through the opening 16*a* of the microphone block 16 and the opening 15*a* of the microphone substrate 15, and reaches the microphone 5. The other configuration is the same as the first embodiment.

(1) In the third embodiment having such a configuration, the sound path groove 18 is provided spirally on the inner surface of the ear-canal insertion portion 10. Therefore, by adjusting a length of the sound path groove 18 according to the usage of the microphone 5, the volume of the sound path A can be easily adjusted. Since the usage of the microphone 5 is not limited to noise cancelling and the microphone 5 may be used as a pressure sensor, by providing the sound path groove spirally, the volume of the sound path A may be adjusted to be suitable for a pressure sensor.

(2) By providing the sound path groove 18 spirally, the volume of the sound path A can be made larger in comparison with a case in which the sound path groove is formed linearly along the axial direction, such that keen pressure changes when the headset is worn can be reduced and the breakage of the diaphragm inside the driver 4 can be prevented. In this case, it is preferable to make the volume of the sound path A as larger as possible by utilizing the shape of the sound path groove 18, because the pressure change becomes smaller as the volume of the sound path A becomes larger. For example, the volume of the sound path A can be made larger by deepening the sound path groove 18 and by extending the length of the sound path groove 18. Meanwhile, since the microphone can acquire the signal if there is a slight change in pressure, by ensuring the certain amount of volume of the sound path A, keen pressure changes when the headset is worn can be suppressed while the microphone 5 acquiring the signal.

(3) An appropriate length is required when the sound path A is used as a sound port of the driver 4, and the resonance frequency can be adjusted to middle-high range by successively adjusting the resonance. For example, when optimizing the length and area of the sound path A, by forming the sound path groove 18 spirally, the space of the sound path can be used as the resonance space of the driver 4 for improving the middle-high range frequency characteristic. The optimization can be achieved in the vibration band necessary for the microphone 5 by utilizing the resonance of the port effect.

(4) Since the microphone 5 and the driver 4 are integrated via the microphone block 16 in the ear-canal insertion portion 10, unevenness at the time of assembling can be reduced. Furthermore, by providing the sound path groove in the housing 1, a number of parts can be reduced, and the assembly work can be easily performed.

(5) Since the microphone 5 can be arranged near the ear canal, external environment such as wind noise can be excellently screened, and the vibration of the audible and inaudible frequency band transmitted via the ear canal can be effectively acquired. In particular, since the signal can be directly acquired using the sound path formed in the ear-canal insertion portion 10 while screening the external environment, the headset is advantageous for biometrics, etc.

(6) Since the driver 4 and the microphone 5 are arranged inside the housing 1, in particular the ear-canal insertion portion 10, waterproof, drip proof, and dustproof performance when the headset is worn are improved.

4. Fourth Embodiment

Figure 9:
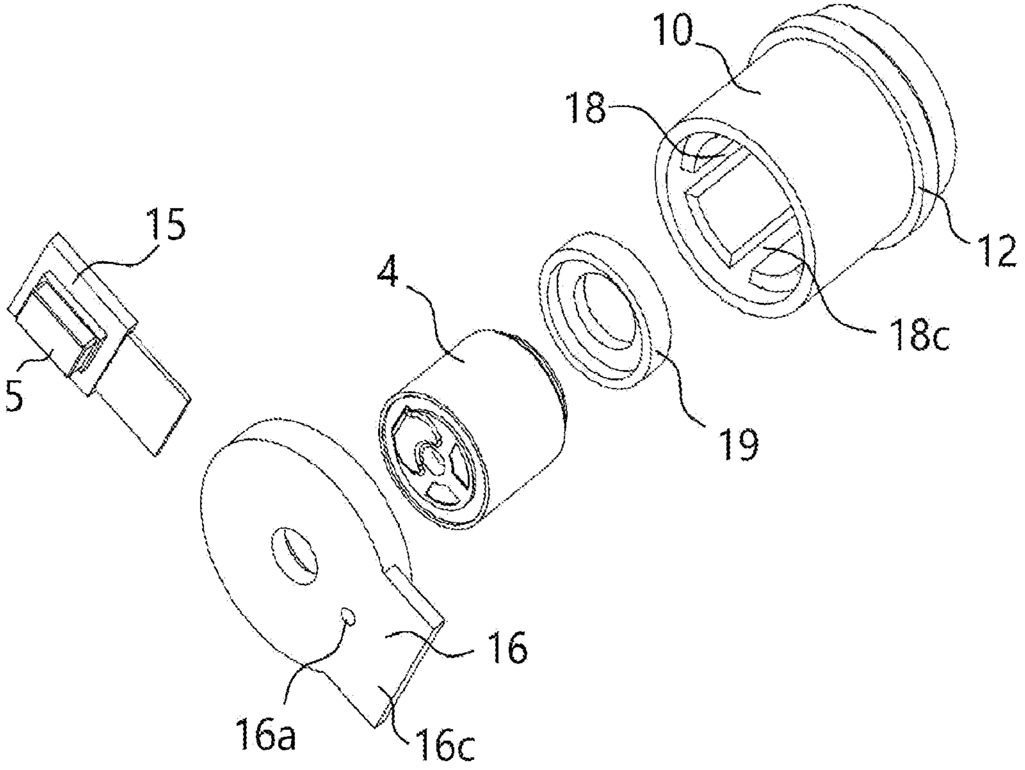
FIG. 9 is an exploded perspective view of a driver, a microphone, a microphone block, and an ear-canal insertion portion of the fourth embodiment.

As illustrated in FIGS. 9 to 13, the fourth embodiment has a plurality of the sound path A inside the ear-canal insertion portion 10. As illustrated in FIG. 9, the basic structures of the driver 4, the microphone 5, the microphone block 16, and the ear-canal insertion portion 10 are the same as the third embodiment.

Figure 10:
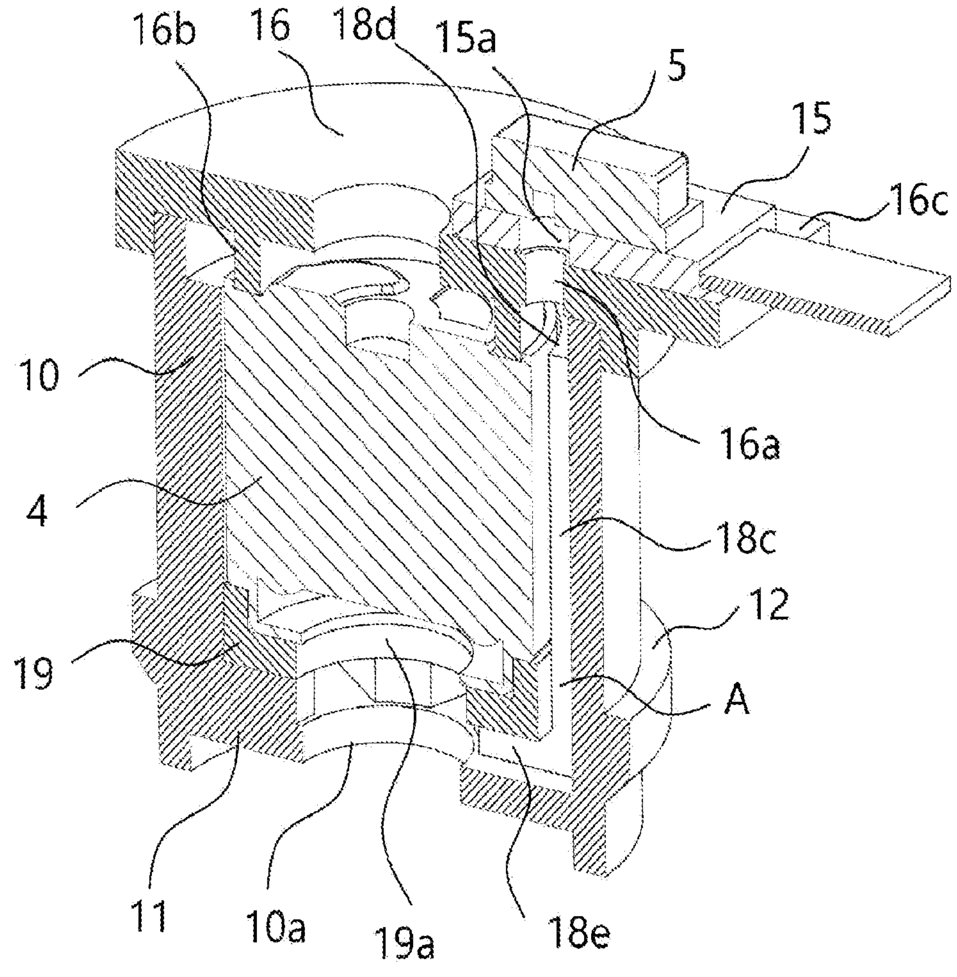
FIG. 10 is a vertical cross-sectional view of a driver, a microphone, a microphone block, and an ear-canal insertion portion of the fourth embodiment.

As illustrated in FIGS. 9 and 10, a front cover 19 is provided between the positioning portion 11 of the ear-canal insertion portion 10, and the driver 4. The front cover 19 is a ring-shape member formed along the outer circumference surface of the outer surface and the front surface of the driver 4, and is arranged between the driver 4 and the positioning portion 11 of the ear-canal insertion portion 10. Note that, although the front cover 19 and the ear-canal insertion portion 10 are separate member in the present embodiment, it is preferable that they are integrated.

Figure 11:
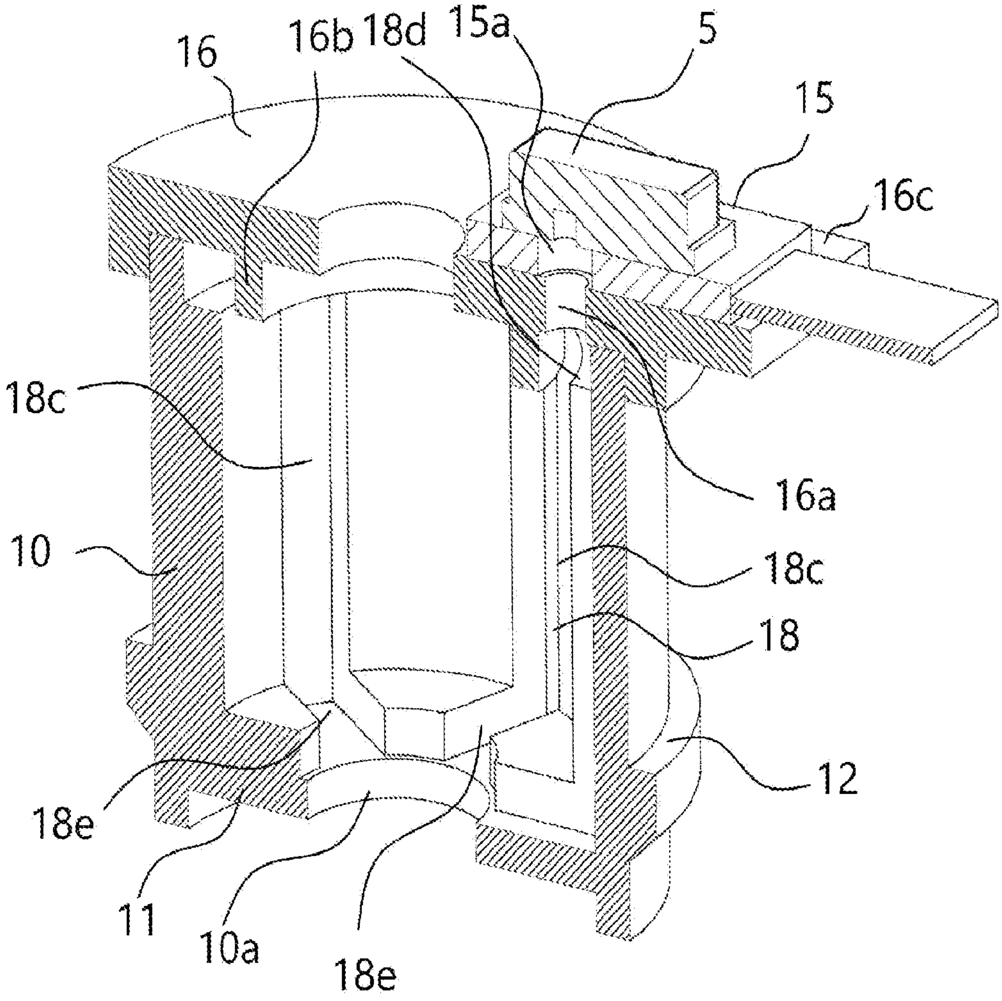
FIG. 11 is a vertical cross-sectional view of a microphone, a microphone block, and an ear-canal insertion portion of the fourth embodiment.

As illustrated in FIG. 11, a radial portion 18*e* that is an introduction portion of the sound path groove 18 forming the sound path A is expanded radially in the outer circumferential direction from the opening 10*a*. The middle portion 18*c* of the sound path groove 18 is formed in the inner surface of the ear-canal insertion portion 10 to face the outer surface of the driver 4 and is formed along the axial direction of the driver 4 from the outer circumferential end of the radial portion 18*e*. Note that, although five middle portions 18*c* and five radial portions 18*e* for the sound path groove 18, the number is not limited to five and may be changed as appropriate. As illustrated in FIGS. 10 and 11, the step 18*d* is provided in the backside end of the sound path groove 18, and the sound path A is formed between the step 18*d* and the inner circumferential wall 16*b* of the microphone block 16. Each backside end of the middle portion 18*c* is communicated with the step 18*d*, and the sound path A is communicated to the opening 16*a* of the microphone block 16 via the radial portion 18*e*, the middle portion 18*c*, and the step 18*d*.

Figure 12:
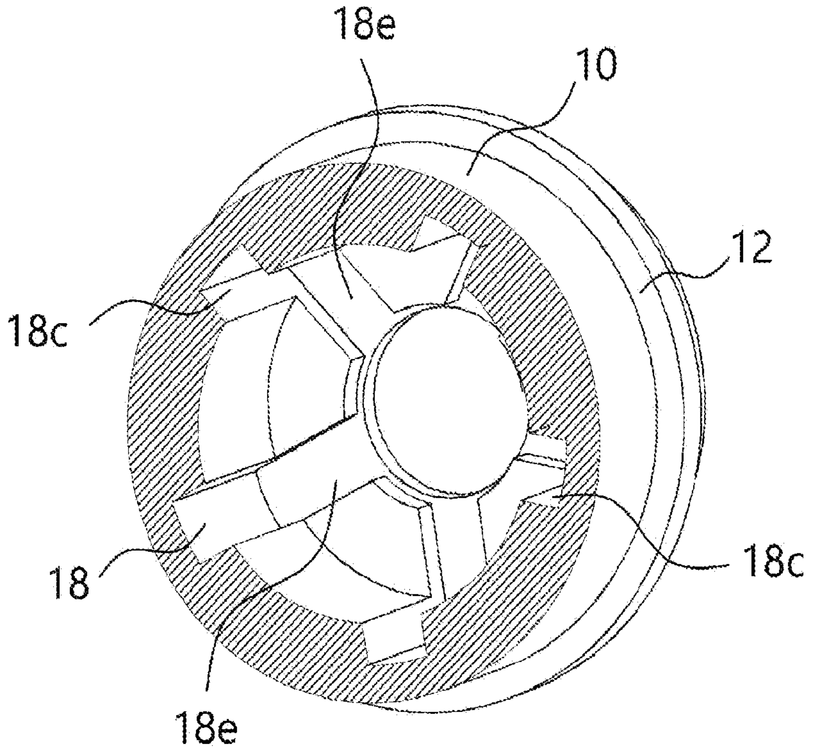
FIG. 12 is a horizontal cross-sectional view of an ear-canal insertion portion of the fourth embodiment.
Figure 13:
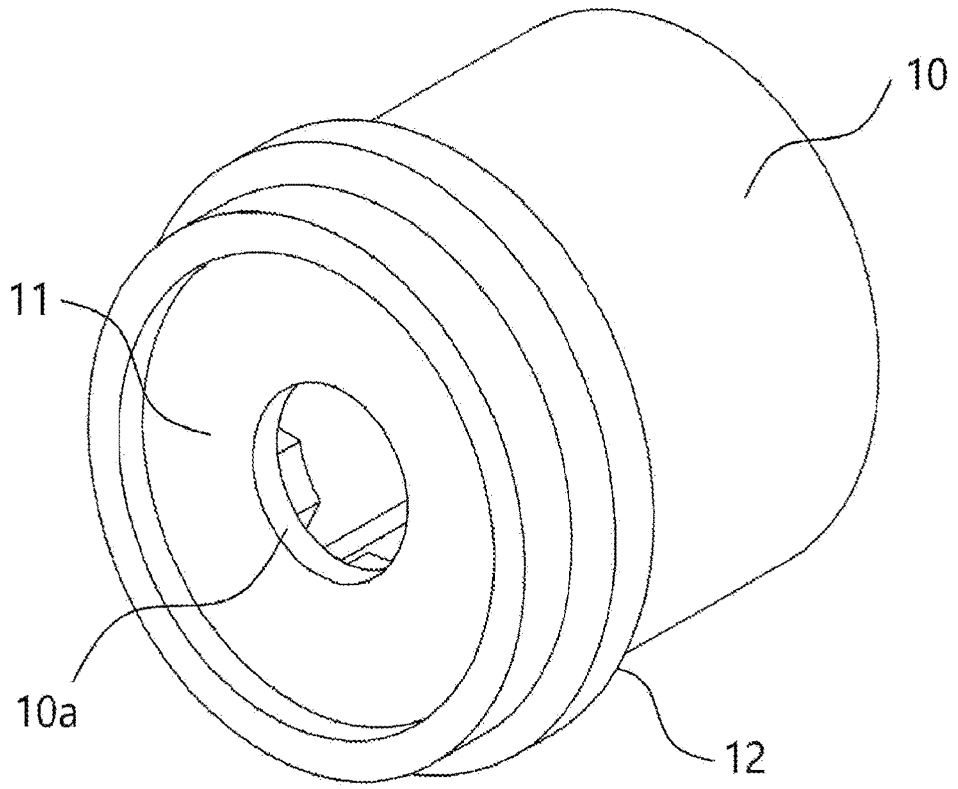
FIG. 13 is a front perspective view of an ear-canal insertion portion of the fourth embodiment.

As illustrated in FIG. 13, the opening 10*a* is provided in the positioning portion 11. As illustrated in FIGS. 11 and 12, the vibration of the audible and inaudible frequency band inside the ear canal passes through the radial portion 18*e* from the opening 10*a*, passes through the middle portion 18*c*, passes through the step 18*d*, then passes through the opening 16*a* of the microphone block 16 and the opening 15*a* of the microphone substrate 15, and reaches the microphone 5. The other configuration is the same as the first embodiment.

(1) In the fourth embodiment having such a configuration, the opening of the sound path A of the microphone 5 cannot be directly seen from the ear-canal side, in addition to the effect of the third embodiment. Therefore, the small opening of the sound path would not likely be blocked by contamination, etc.

(2) In the fourth embodiment, by providing a plurality of the sound paths A connected to the opening 10*a* of the driver 4 at the front side, the volume of the sound path A can be made larger. Furthermore, since the pressure change can be dispersed to the plurality of the sound paths A, the keen pressure changes when the headset is worn can be reduced and the breakage of the diaphragm inside the driver 4 can be prevented.

(3) Also in the fourth embodiment, the space of the sound path can be used as the sound port. The resonance of the port effect in the vibration band necessary for the microphone 5 can be optimized using the plurality of the sound paths A. Furthermore, although all of the sound paths A are integrated at the step 18*d* in the fourth embodiment, not all of the sound paths A have to be integrated, and the sound path may be configured for usages other than the microphone 5. For example, four among the five sound paths A in the fourth embodiment may be integrated at the step 18*d*, and the remaining one sound path A may be closed to form the closed sound space. In this case, the closed sound space can form the resonance space of the driver 4.

(4) The headset may include other microphones, temperature sensors, and other sensors, in addition to the microphone 5. By administering the plurality of the sound paths A to the microphones and various sensors, various information can be acquired. For example, by connecting the sound path to the temperature sensor, temperature in the ear-canal cane be acquired. Also in this case, the plurality of the sound paths may be integrated to increase an amount of air, improving the temperature detection accuracy.

(5) Note that the number of the sound paths, the combination of the integration of the sound paths, and the combination of various sensors are not limited to the above embodiment. Furthermore, the groove shape of the sound path groove is not limited to a uniform cross section, and may be changed in the middle.

5. Fifth Embodiment

Figure 14:
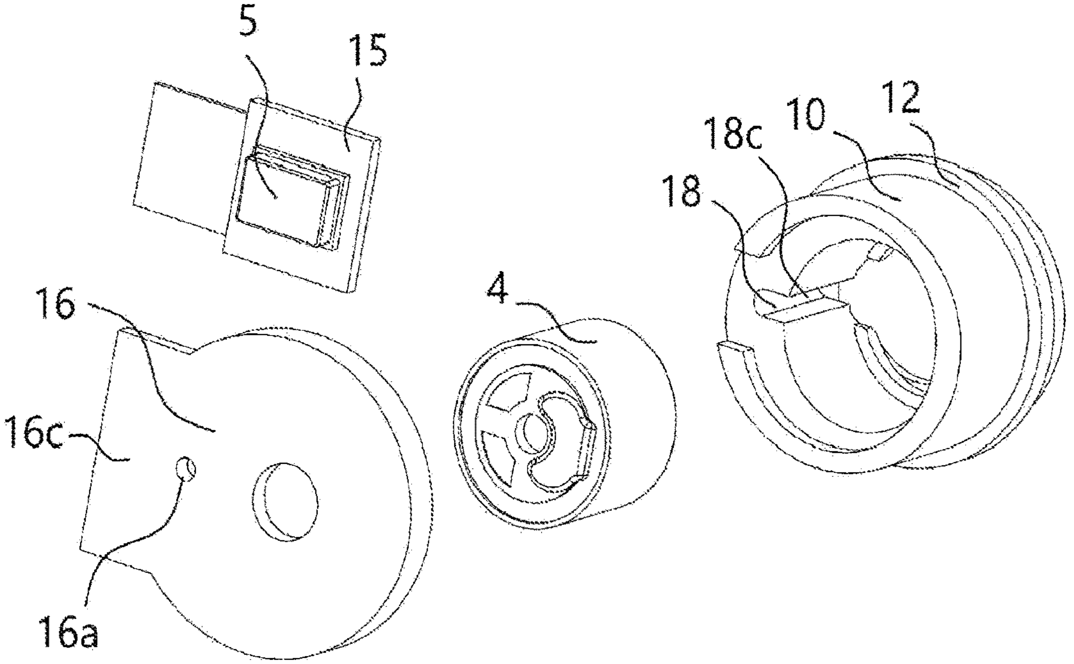
FIG. 14 is an exploded perspective view of a driver, a microphone, a microphone block, and an ear-canal insertion portion of the fifth embodiment.

As illustrated in FIGS. 14 to 17, in the fifth embodiment, the sound path A is provided in the ear-canal insertion portion 10 in parallel with the axial direction of the driver 4. As illustrated in FIG. 14, the basic structures of the driver 4, the microphone 5, the microphone block 16, and the ear-canal insertion portion 10 are the same as the third embodiment.

Figure 15:
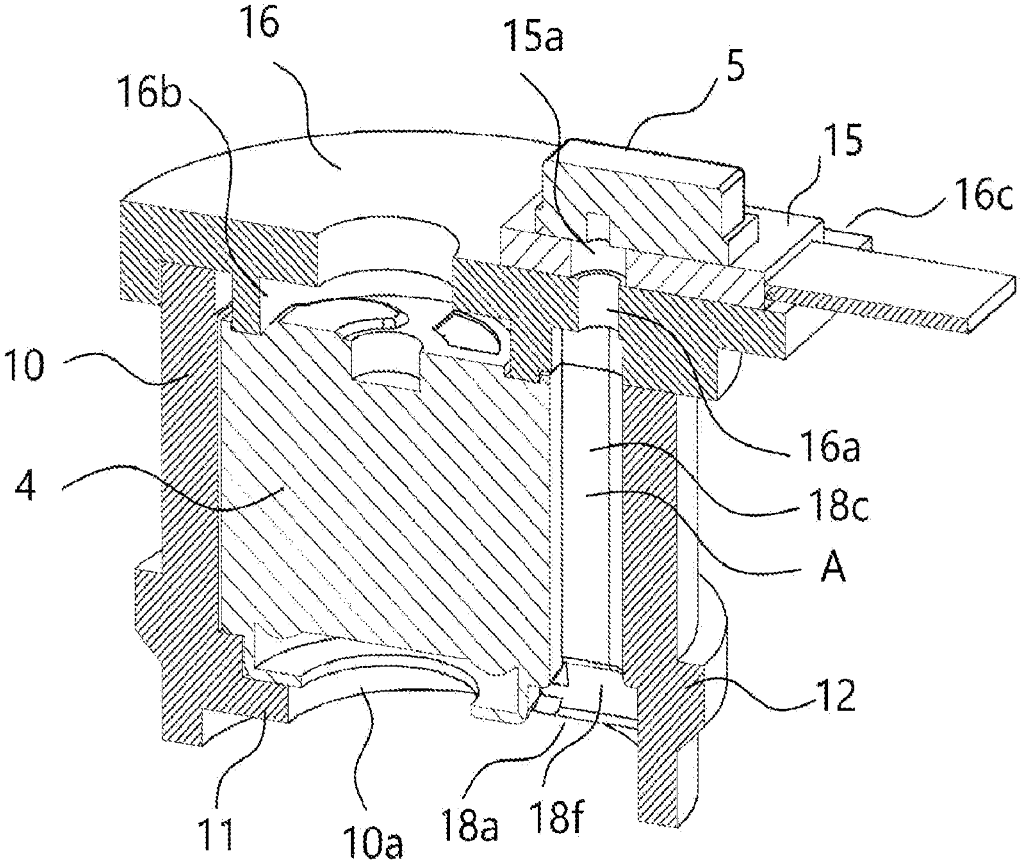
FIG. 15 is a vertical cross-sectional view of a driver, a microphone, a microphone block, and an ear-canal insertion portion of the fifth embodiment.
Figure 16:
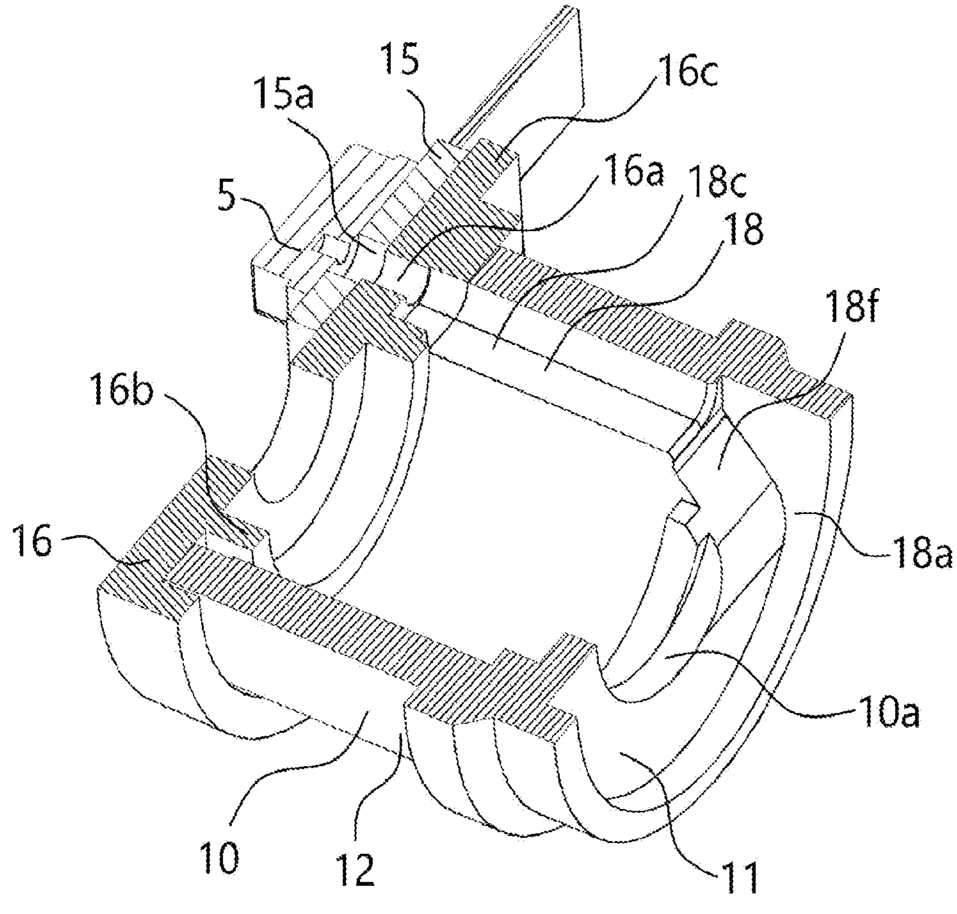
FIG. 16 is a vertical cross-sectional view of a microphone, a microphone block, and an ear-canal insertion portion of the fifth embodiment.
Figure 17:
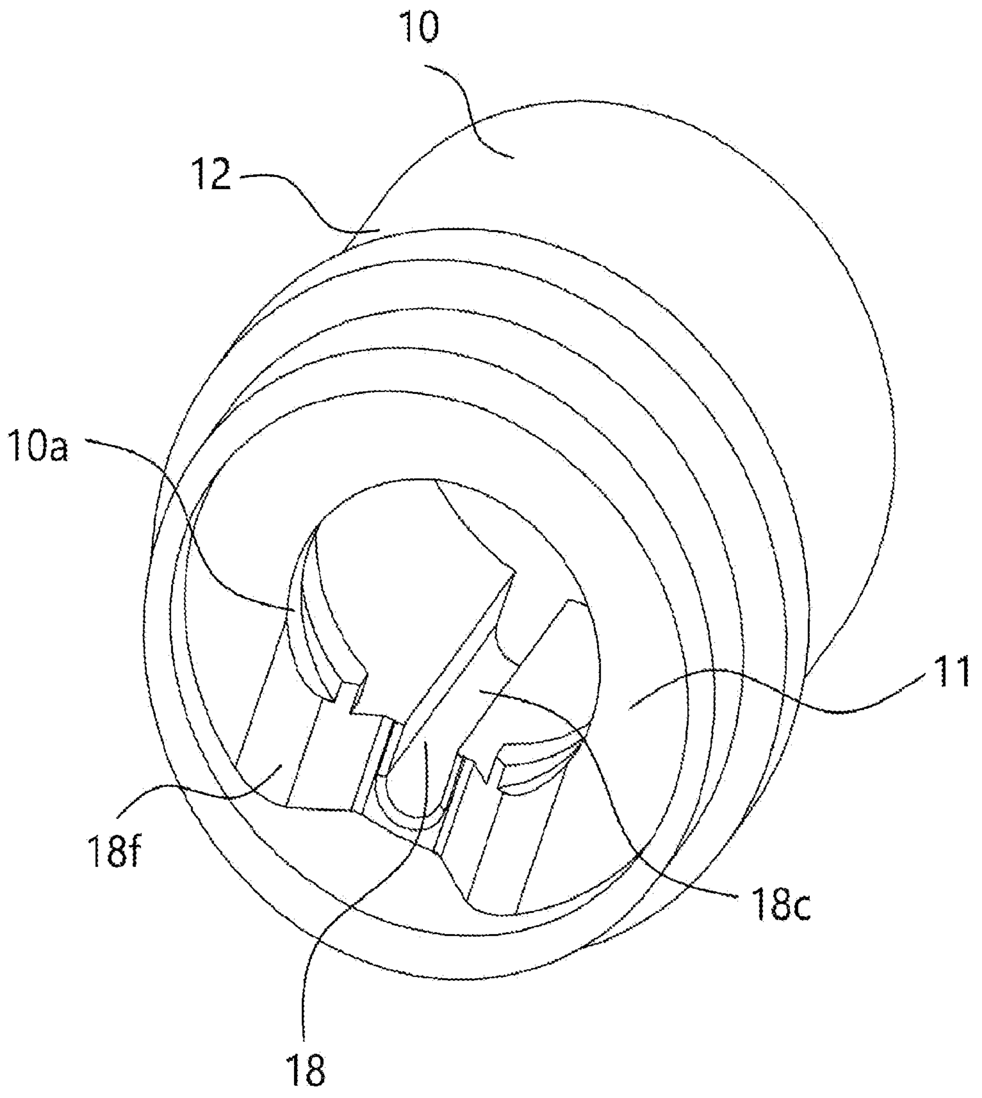
FIG. 17 is a front perspective view of an ear-canal insertion portion of the fifth embodiment.

As illustrated in FIG. 14, in the present embodiment, the sound path groove 18 is formed as a groove with semi-elliptical cross section on the inner surface of the ear-canal insertion portion 10 with cylindrical shape. As illustrated in FIGS. 15 and 16, the introduction portion 18*a* of the sound path groove 18 is linearly formed, and the front end is connected to a curved portion 18*f*. As illustrated in FIG. 16, the curved portion 18*f* is a smoothly curved surface largely opened to the front surface of the positioning portion 11 of the ear-canal insertion portion 10 and extended in both the right and left, and is smoothly connected toward the sound path and the introduction portion 18*a* of the sound path groove 18 at the front portion in a streamline-manner. The sound path A is passes through the middle portion 18*c* from the introduction portion 18*a* and is linearly communicated to the opening 16*a* of the microphone block 16, via the curved portion 18*f*. Therefore, as illustrated in FIGS. 15 and 16, the vibration of the audible and inaudible frequency band inside the ear canal is linearly transmitted inside the sound path A and reaches the microphone 5.

As described above, the vibration of the audible and inaudible frequency band inside the ear canal passes through the curved portion 18*f*, passes through the opening 16*a* of the microphone block 16 and the opening 15*a* of the microphone substrate 15, and reaches the microphone 5. The other configuration is the same as the first embodiment.

In the fifth embodiment having such a configuration, since the vibration of the audible and inaudible frequency band inside the ear canal passes through the smooth curved portion 18*f* and passes directly through the sound path A, the vibration can smoothly reaches the microphone 5, in addition to the effect as same as the third embodiment. Therefore, unnecessary resonance and reflection in the vibration of the audible and inaudible frequency band to be acquired can be reduced, and the response signal with high accuracy can be obtained.

6. Other Embodiment

As described above, several embodiments of the present disclosure are described, however, they are not intended to limit the scope of the invention, and other various embodiment may be implemented without departing from an abstract of the invention, and various omissions, replacements, and modifications may be performed. Furthermore, these embodiments, combinations, and modifications are included in the scope and abstract of the invention, and are included in the invention described in the scope of claims and equivalent range thereto. IN below, embodiments included in the present disclosure are exemplified.

(1) The driver 4 and the microphone 5 may be arranged inside the ear-canal insertion portion 10. The location of the driver 4 and the microphone 5 is not limited as long as the microphone 5 is at the side or back of the signal outputting surface of the driver 4.

(2) The housing 1 is not limited to ones that are formed by the main housing 1*a* and the front housing 1*b*, as long as they include the components of the headset therein, and the shape, material, and size thereof are not limited.

(3) The microphone 5 may not acquire the response signal for noise cancelling and biometrics. The microphone 5 may be widely used, for example, for detection of the pressure change inside the ear canal or for plethysmography.

(4) The sound path groove 18 may not be provided on the inner surface of the ear-canal insertion portion 10, and may form a sound path communicating the microphone 5 and the front of the driver 4 between the outer surface of the driver 4 and the inner surface of the ear-canal insertion portion 10, by forming concavity and convex on the outer surface of the casing of the driver 4. Furthermore, the cross-sectional shape of the groove (which may be semi-circular, rectangular, or star-shaped and are not limited), number, and position of the sound path groove 18 may be changed as appropriate.

(5) The headset is not limited to wireless headsets in which cables between the headset and terminals such as mobile phones or other information communication devices or between right and left headsets are not necessary, and the headset may be a headset with cables. Furthermore, the headset may be for both ears or one of the ears. In addition, the headset is not limited to a canal-type, and may be inner-ear type.

(6) The structure of the sound path A may be modified as appropriate. For example, the sound path A may employ a curved structure like the first embodiment or may employ a spiral structure like the third embodiment, and the shape thereof is not limited. Note that a path of the sound path A to the microphone 5 is not limited to the above embodiment. For example, the outer surface of the driver 4 is not limited to the outer circumferential surface and the front surface, and the sound path A may be formed by using space at the back surface of the driver 4. Furthermore, the inner wall surface of the sound path A may be a curved surface at any point (a curved portion of the sound path A in a radial or spiral shape, for example, among the sound path groove 18, a connection portion between the introduction portion 18*a* and the middle portion 18*c*, a connection portion between the introduction portion 18*a* and the through hole 18*b*, and the opened edge of the through hole 18*b*). In addition, a corner between a bottom portion and a wall surface portion of the sound path groove in the sound path A in which the sound path groove is formed may be curved.

(7) A number of the sound path A of the microphone 5 is not limited to one, and a plurality of the sound paths A may be formed, and the combinations thereof, such as adding one or more paths for various usage, may be arbitrary set. Furthermore, the cross-sectional area of the sound path A may not be uniform. For example, the sound path groove of the sound path A may transform in the middle and form a space larger or smaller than the opened end of the sound path groove 18.

Figure 18:
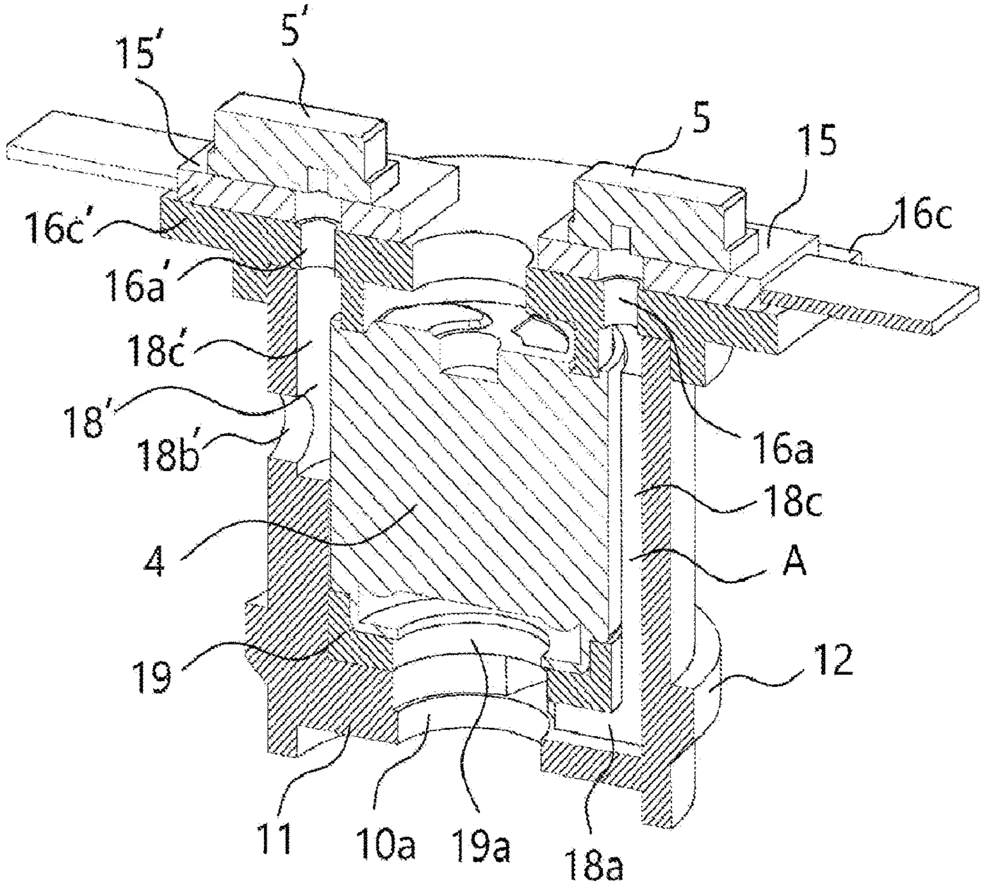
FIG. 18 is a vertical cross-sectional view of a modified example of the fifth embodiment in which two microphones are provided.

(8) A plurality of the microphones 5 may be provided. Furthermore, sensors other than the microphone, such as a temperature sensor, may be provided. In addition, not only microphone may be arranged inside the housing 1, and a plurality of sensors, such as the combination of the microphone and other sensors, may be provide inside the housing 1. In this case, the sensors may be provided for each sound path A, or each of the sound paths A may be combined regardless of the path to communicate each other. For example, as illustrated in FIG. 18, a microphone 5' and a microphone substrate 15' to acquire external environmental information via the sound path A may be provided in addition to the microphone 5 to acquire closed space information between the eardrum inside the ear canal. In this case, the microphone 5 can acquire the vibration of the audible and inaudible frequency band inside the ear canal via the sound path communicated to the opening 10*a*, and the microphone 5' can acquire the external environmental information via the sound path 18' communicated from a through hole 18*b*' which goes through toward the outside to a microphone block opening 16*a*. By this, sound quality at the time of transmission can be improved by using a difference between two signals. Furthermore, external sound inputting and feedforward noise cancelling can be performed using the external environmental information. Note that, in an embodiment of FIG. 18, one sound path (sound path groove 18) corresponding to the microphone 5 and one sound path (sound path groove 18') corresponding to the microphone 5' are provided, however, the sound paths may be shared by branching each sound path and connecting them to various sensors.

(9) When a plurality of the sound path A is provided as the fourth embodiment, the front end of the radial portion 18*e* and the opening 10*a* that are the introduction portion the sound paths A may be smoothly formed in a streamline-curved shape. By making the introduction portion 18*a* in a streamline-curved shape, the vibration of the audible and inaudible frequency band inside the ear canal can be smoothly guided.

Figure 19:
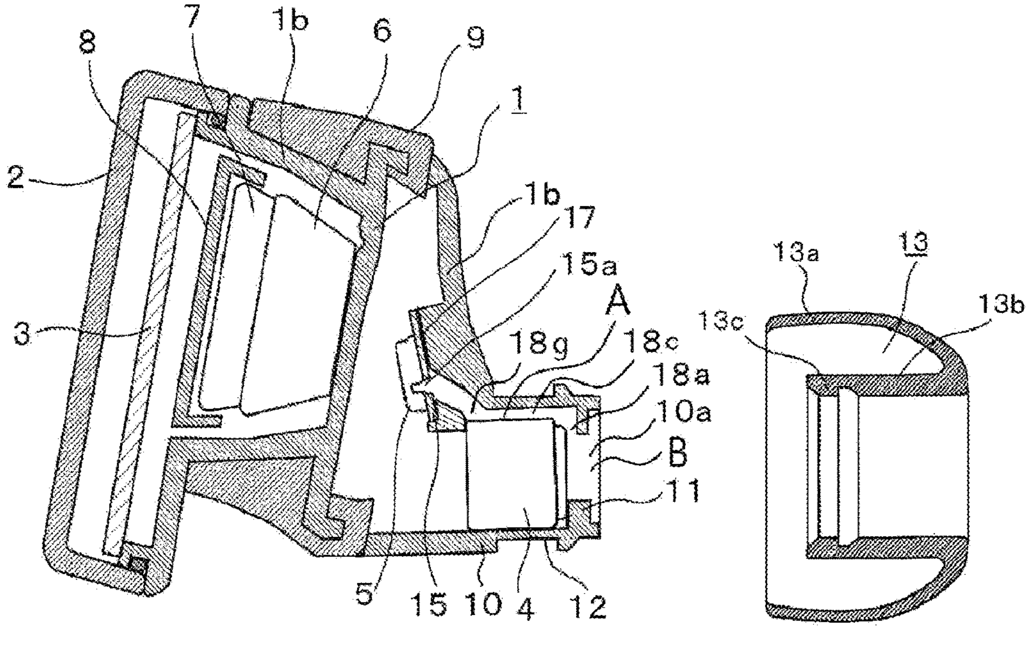
FIG. 19 is a cross-sectional view of an entire configuration of a modified example of the first embodiment.

(10) Although the microphone 5 is fixed to the housing 1 via the microphone block 16 in the first embodiment, the microphone 5 may be directly fixed to the housing 1 as illustrated in FIG. 19.

REFERENCE SIGN

1: housing
1*a*: main housing
1*b*: front housing
2: cover
3: printed wiring substrate
4: driver
5: microphone
10: ear-canal insertion portion
10*a*: opening
11: positioning portion
12: earpiece attachment portion
13: earpiece
15: microphone substrate
16: microphone block
17: pressure-sensitive adhesive
18: sound path groove
19: front cover
A,B: sound path

The invention claimed is:

1. A headset comprising:
a housing worn on user's ears;
an ear-canal insertion portion with a cylindrical shape provided at an ear-canal side of the housing as a part of the housing;
a driver for outputting a signal provided inside the housing; and
a microphone positioned behind a front surface of the driver and acquiring response signals from a front of the driver thought a sound path,
wherein the sound path to the microphone is formed by a portion supporting the driver and an outer surface of the driver;
the outer surface of the driver comprises an outer circumference surface of the driver and the front surface of the driver,
wherein a sound path groove is formed on the portion supporting the driver or the outer surface of the driver; and
the sound path is formed by the sound path groove,
wherein the sound path groove includes an introduction portion that extends from a central axis of the driver toward a circumferential direction of the driver in a front portion of the ear-canal insertion portion at the ear-canal side.

2. The headset according to claim 1, wherein the driver is arranged inside the ear-canal insertion portion.

3. The headset according to claim 2, wherein the microphone is provided behind the driver inside the housing.

4. The headset according to claim 3, wherein the microphone is arranged inside the ear-canal insertion portion.

5. The headset according to claim 1, wherein the driver and the microphone are provided behind the ear-canal insertion portion inside the housing.

6. The headset according to claim 1, wherein a plurality of sound paths are provided for the microphone.

7. The headset according to claim 1, wherein a plurality of microphones are provided, and the sound path that reaches to each of the microphones is provided.

8. The headset according to claim 1, wherein the sound path that becomes a resonance space is provided inside the housing.

9. The headset according to claim 1, wherein the portion supporting the driver is the housing, or the portion supporting the driver is a microphone block in which the microphone block supports the microphone.

10. The headset according to claim 1, wherein the sound path is formed by the sound path groove formed on an inner surface of the housing, and by the outer surface of the driver.

11. The headset according to claim 1, wherein the sound path is formed by the sound path groove formed on the outer surface of the driver, and by an inner surface of the housing.

12. The headset according to claim 1, wherein the sound path is formed by the sound path groove formed on an inner surface of the housing, and the sound path groove formed on the outer surface of the driver.

13. The headset according to claim 1, wherein the sound path groove is formed spirally on the inner surface of the housing and/or the outer surface of the driver.

14. The headset according to claim 1, wherein a plurality of sound grooves are formed on the inner surface of the housing or the outer surface of the driver.

15. The headset according to claim 1, wherein an inner wall surface of a curved portion of the sound path groove is formed by a curved surface.

* * * * *